US007834078B2

(12) United States Patent
Matsumoto et al.

(10) Patent No.: US 7,834,078 B2
(45) Date of Patent: Nov. 16, 2010

(54) FIBER-REINFORCED RESIN COMPOSITION FOR PARTS OF AIR INTAKE SYSTEM OF INTERNAL COMBUSTION ENGINE

(75) Inventors: Taketoshi Matsumoto, Hamamatsu (JP); Jun Suzuki, Hamamatsu (JP); Tohru Iwashita, Ichihara (JP); Minoru Sugawara, Ichihara (JP)

(73) Assignees: Toyo Roki Seizo Kabushiki Kaisha, Shizuoka (JP); Prime Polymer Co., Ltd., Tokyo (JP)

( * ) Notice: Subject to any disclaimer, the term of this patent is extended or adjusted under 35 U.S.C. 154(b) by 1291 days.

(21) Appl. No.: 10/562,679

(22) PCT Filed: Jun. 29, 2004

(86) PCT No.: PCT/JP2004/009146

§ 371 (c)(1),
(2), (4) Date: Feb. 23, 2006

(87) PCT Pub. No.: WO2005/001276

PCT Pub. Date: Jan. 6, 2005

(65) Prior Publication Data
US 2006/0167161 A1    Jul. 27, 2006

(30) Foreign Application Priority Data
Jun. 30, 2003    (JP)    ............ P2003-188690

(51) Int. Cl.
*C08K 3/34*    (2006.01)

(52) U.S. Cl. .............. 524/449; 524/494; 524/505
(58) Field of Classification Search ........... 524/449, 524/494, 505
See application file for complete search history.

(56) References Cited

U.S. PATENT DOCUMENTS

| 5,116,899 A | * | 5/1992 | Aratake et al. ............ 524/371 |
| 5,248,738 A | | 9/1993 | Sato et al. |
| 2002/0037965 A1 | * | 3/2002 | Kinoshita et al. .......... 525/127 |

FOREIGN PATENT DOCUMENTS

| JP | 62-295940 | | 12/1987 |
| JP | 2-138349 | | 5/1990 |
| JP | H02-238038 | * | 9/1990 |
| JP | 5-59233 | | 3/1993 |
| JP | 9-29026 | | 2/1997 |
| JP | 2682921 | | 8/1997 |
| JP | 2000-297709 | | 10/2000 |

* cited by examiner

*Primary Examiner*—Robert D. Harlan
(74) *Attorney, Agent, or Firm*—Young & Thompson (57) ABSTRACT

Main object is to provide a composition for parts of the intake system, which is capable of enhancing the flexural elasticity modulus of the parts of the intake system and reducing the specific gravity of the parts. Disclosed is a fiber reinforced resin composition for parts of intake system on the internal combustion engine comprising a block polypropylene type resin which has a MFR in the range of 40-70 g/10 minutes (at 230° C. and under a load of 2.16 kg) and which is in the range of 60-80% by weight of the composition, and glass fibers and mica the total of which are in the range of 20-40% by weight of the composition.

14 Claims, 5 Drawing Sheets

<RESULT OF INERTANCE>

FIG. 5

FIBER-REINFORCED RESIN COMPOSITION FOR PARTS OF AIR INTAKE SYSTEM OF INTERNAL COMBUSTION ENGINE

TECHNICAL FIELD

The present invention relates to a fiber reinforced resin composition for parts of intake system on the internal combustion engine.

BACKGROUND ART

In the intake system of the internal combustion engine, provided are an air duct constituting an intake channel of the internal combustion engine, a resonater or a side branch which is provided in the intake channel of the internal combustion engine and functions for reducing intake noise, and an air cleaner which collects dusts in the intake channel of the internal combustion engine.

When the internal combustion engine is run and thus air is led into the internal combustion, an intake noise may be caused by the intake system's parts. In order to reduce the intake noise, a technique of enhancing the flexural elasticity modulus of the parts and thickening the thickness of the parts has been adapted conventionally. For example, to use a resin composition which is composed of polypropylene resin and talc as a stiffness reinforcing material blended at about 40% by weight of the composition, and to enhance the thickness of the parts have been adapted as the technique. However, such a technique is obliged to be accompanied with a problem of weight increase in the parts.

DISCLOSURE OF THE INVENTION

Problems to be Solved by the Invention

Frequency range of the intake noise for the internal combustion engine is, for example, about 100-400 Hz and it is relatively low. We, the inventors, focused attention on the point that the frequency range of intake noise for the internal combustion engine is low. Then, the inventors have been found that the resonance frequency of the intake system's parts can be shifted to a high frequency by enhancing the flexural elasticity modulus of the intake system's parts and reducing specific gravity of the parts. By shifting the resonance frequency of the intake system's parts to a high frequency, it is possible to make the resonance frequency of the intake system's parts far away from the frequency range of intake noise. Thereby, the reduction of the intake noise of the low frequency range at the intake system's parts can be attained.

Therefore, the present invention aims to provide a composition for intake system's parts, which is capable of enhancing the flexural elasticity modulus of the intake system's parts and reducing the specific gravity of the parts.

Means for Solving the Problems

For solving the above mentioned problems, an invention claimed in claim 1 is characterized in that the composition comprises a block polypropylene type resin which has a Melt Flow Rate (MFR) in the range of 40-70 g/10 minutes (at 230° C. and under a load of 2.16 kg) and which is in the range of 60-80% by weight of the composition, and glass fibers and mica the total of which are in the range of 20-40% by weight of the composition.

Further, an invention claimed in claim 2 is characterized in that the composition comprises a block polypropylene type resin which has a MFR in the range of 40-70 g/10 minutes (at 230° C. and under a load of 2.16 kg) and which is in the range of 58-78% by weight of the composition, an acid modified polyprene [sic] type resin which is in the range of 1-2% by weight of the composition, and glass fibers and mica the total of which are in the range of 20-40% by weight of the composition.

The intake system's parts according to the present invention is any one of an air duct constituting an intake channel of the internal combustion engine, a resonater or a side branch which is provided in the intake channel of the internal combustion engine and functions for reducing intake noise, and an air cleaner which collects dusts in the intake channel of internal combustion engine.

An invention claimed in claim 4 is a fiber reinforced resin composition for parts of intake system on the internal combustion engine which is characterized in that the composition comprises a block polypropylene type resin which has a MFR in the range of 40-70 g/10 minutes (at 230° C. and under a load of 2.16 kg) and which is in the range of 60-80% by weight of the composition, and mica which is in the range of 20-40% by weight of the composition.

EFFECTS OF THE INVENTION

According to the present invention, a fiber reinforced resin composition for parts of intake system on the internal combustion engine can be obtained which is able to heighten the flexural elasticity modulus of the intake system's parts and reduce the specific gravity of the parts. Consequently, in the intake system's parts, the intake noise can be reduced without suffering from a weight increase.

Moreover, when the composition according to this invention is used with the aim of getting the same inertance with that of which the prior resin composition for intake system's parts is used, the producted article can have a lower specific gravity and a thinner thickness, and thus realize a weight loss.

BEST MODE FOR CARRYING OUT THE INVENTION

An embodiment of a fiber reinforced resin composition for parts of intake system on the internal combustion engine of the present invention will be described below. As the part of the intake system, any of an air duct constituting an intake channel of internal combustion engine, a resonator or a side branch which is provided in the intake channel of internal combustion engine and functions for reducing intake noise, and an air cleaner which collects dusts in the intake channel of the internal combustion engine may be used.

The fiber reinforced resin composition for parts of intake system on the internal combustion engine comprises a block polypropylene type resin which has a MFR in the range of 40-70 g/10 minutes (at 230° C. and under a load of 2.16 kg) and which is in the range of 60-80% by weight of the composition, and glass fibers and mica the total of which are in the range of 20-40% by weight of the composition.

As the type of polypropylene to be used, block polypropylene that is a polymer of propylene is used.

MFR (at 230° C. and under a load of 2.16 kg) of the polypropylene is preferably 40-70 g/10 minutes, and more preferably 50-60 g/10 minutes. The MFR values of polypropylene used herein are determined in accordance with JIS K-7210-1999 and under the conditions that temperature is at 230° C. and a load is of 2.16 kg. If the MFR is not more than 40 g/10 minutes, dispersion of glass fibers in a molded article may become wrong and the appearance of the article may fail. If the MFR is more than 60 g/10 minutes, there is some possibility of being worse in impact intensity and it is not preferred.

The polymer of propylene is prepared by a slurry polymerization, a vapor phase polymerization, or a liquid phase bulk polymerization of propylene and so on, with using a catalyst for polymerization. As the mode of polymerization for preparing propylene polymer, each mode of batch polymerization and continuance polymerization can be used. The MFR of the polypropylene can be adjusted by multi-stage polymerization or decomposition of the polymerizing resin.

It is preferred to blend a block polypropylene type resin having a MFR in the range of 40-70 g/10 minutes and a modified polypropylene type resin which is modified with an acid such as maleic acid, when the composition is prepared. The MFR of the maleic acid modified polypropylene is preferably in the range of 5-800 g/10 minutes. When the MFR is too low, inferior dispersion of the resin will be occurred, and when the MFR is more than 800 g/10 minutes, there are some possibility that the impact intensity of the resin becomes low inadequately. It is desirable that crystallization temperature (Tc) of the maleic acid modified polypropylene is in the range of 105-125° C., and more preferably, in the range of 110-120° C. Further, it is desirable that additional volume of the maleic acid is in the range of 0.1-10% by weight, and more preferably, in the range of 0.8-8% by weight.

As the glass fiber, any filament like fibers which are manufactured by melting and spinning any glass such as E glass (Electrical glass), C glass (Chemical glass), A glass (Alkali glass), S glass (High strength glass), or alkali-proof glass can be used.

It is desirable that fiber diameter of the glass fiber is in the range of 3.-30 mm and more preferably, in the range of 8-20 mm. When the fiber diameter is too small, the productivity of the reinforced fibers bundle would be lowered since the fibers are easy to break. Further, when pellets are manufactured continuously, such a small diameter is not preferable because it is necessary to bundle many fibers, the work of connecting the fiber bundle is complicated, and the productivity is decreased.

Fiber length of the glass fiber in the resin composition is preferably in the range of 1.5-60 mm. For short fiber resin composition, the fiber length is preferably in the range of 1.5-8 mm, and for long fiber resin composition, the fiber length is preferably in the range of 12-50 mm.

As material of glass long fiber, the continuous glass fiber bundle is used, and this is commercially available as glass roving. Usually, it is preferable that the average fiber diameter thereof is in the range of 4-30 mm, the number of filaments to be bundled is in the range of 400-10,000, Tex count is in the range of 300-20,000 g/km. Further, it is especially preferable that the average fiber diameter is in the range of 9-23 mm, the number of filament to be bundled is in the range of 1,000-6,000.

Alternatively, as another glass fiber, a glass chopped strand can also be used. The glass chopped strand is usually 3-50 mm in length thereof, fiber diameter of it is about 3-25 mm, preferably 8-14 mm in fiber diameter thereof.

It is preferable that surface treatment (for example, silane coupling agent treatment) is performed to the glass fiber in order to give or improve an interface adhesive property of the surface of the glass fiber to the thermoplastic to be used. When the reinforced fibers treated in advance such a treatment is used, a molded article can be expected with a good strength and appearance.

As the surface treating agent to the glass fiber, any one selecting adequately from known agents which include the so-called silane type coupling agents and titanium type coupling agents can be used. As the silane type compounds, amino silane and epoxy silane are used. For example, ,,-aminopropyl trimethoxysilane, N-,,-(aminoethyl)-,,-aminopropyl trimethoxysilane, ,,-glycidoxypropyl trimetoxysilane, ,,-(3,4-epoxycyclohexyl) ethyl trimethoxysilane vinyl triethoxysilane, vinyl-tris(beta-methoxyethoxy)silane, ,,-methacryloxypropyl trimethoxysilane, ,,-(2,4-epoxycyclohexyl) ethoxymethoxysilane, ,,-(2-aminoethyl) aminopropyl trimethoxysilane, N-,,-(aminoethyl)-,,-aminopropyl trimethoxysilane, and so on are included. The amino type silane compounds are especially preferable.

The shape of the resin composition may be any one of powder, flake and pellet. Specific gravity of the glass fiber resin composition is preferably 1.2 or less, and more preferably 1.15 or less. The glass fibers in the glass fiber resin composition is preferably in the range of 5-15% by weight, and the mica in it is preferably in the range of 15-25% by weight.

Moreover, it is desirable that the resin composition comprises polypropylene resin and the glass fibers arranged mutually in parallel substantially. Further, it is preferable that the resin composition comprises pellets the length of which is substantially equal to the length of glass fiber included in. The pellet length of the resin composition is preferably in the range of 2-200 mm. The pellet length is preferably in the range of 3-100 mm, more preferably in the range of 3-50 mm, and particularly preferably in the range of 6-25 mm.

Next, a preparing method of the resin composition is explained. At first, resin pellets are prepared. The resin pellets can be obtained easily, by directing a roving which is made of thousands of the glass fibers into a impregnating die, impregnating the melting thermoplastic resin between filaments equally, and cutting to required length (2-200 mm) after impregnation.

Figure 1:
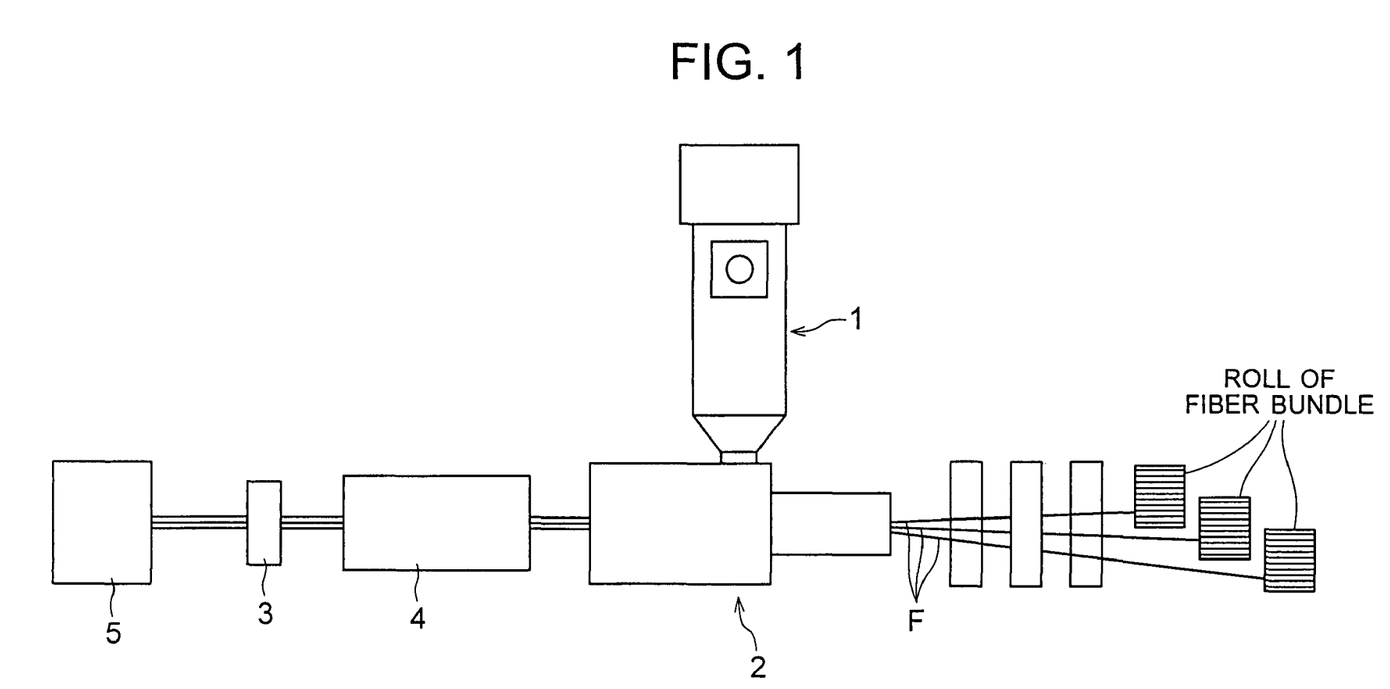
FIG. 1 is a schematic diagram showing an example of a pellet manufacturing machine.

FIG. 1 shows an example of the manufacturing machine of the pellet. For example, a method wherein, while melted resin is supplied from an extruder 1 into the impregnating die 2 provided at the tip of an extruder 1, the continuous glass fiber bundle F is passed through the impregnating die 2, the melting resin is impregnated into glass fiber bundle F, and then, the glass fiber bundle F is pulled out through the nozzle, and the glass fiber bundle F is pelletized in length of 2-50 mm, is used. The glass fiber bundle F is pulled out from the impregnating die 2 by a pulling out roll 3, and is cooled with a cooling machine 4. The glass fiber impregnating resin is pelletized by the pelletizer 5. Respective components are mixed together and dispersed in a predetermined ratio using a roll mill, a Banbury mixer, a kneader, etc. Alternatively, the components can be also dry blended using a tumbler type blender, a henschel mixer, a ribbon mixer, etc. The obtained mixture is kneaded with a uniaxial extruder, a biaxial extruder, etc., in order to prepare a molding material in pellet form.

To the pellet, it is possible to add various kinds of additive agents as necessitated by use. For example, various modifiers such as dispersing agents, lubricants, plasticizers, flame retarderants, antioxidants (phenol type antioxidants, phospho-antioxidants[sic], sulfur type antioxidants), antistatic agents, photostabilizers, ultraviolet ray absorbents, crystallization accelerators (nucleus increasing agents), foaming agents, cross-linking agents, and antimicrobial agents, and so on; various coloring agents including pigments and dyes, such as carbon black, titanium oxide, iron oxide red, azo pigments, anthraquinone pigments, and phthalocyanine, and so on are included as the additive agents. These additive agents can be added into pellet at the time of the pellets' preparation in order to be included in the preparing pellets. Alternatively, these additive agents may be added at the time of molded article manufacturing from the pellets.

This pellet, mica, and block polypropylene type resin having a MFR in the range of 40-70 g/10 minutes are mixed, and then molded in order to obtain the molded article.

As the molding or forming method in order to obtain the molded article, any known molded method can be utilized unrestrictedly in anyway, such as an injection molding method, an extrusion molding method, a blow molding method, compression molding method, an injection-compression-molding method, gas infusing injection molding, or foaming injection molding, and soon. The injection molding method, the compression molding method, and the injection-compression-molding method are especially preferable.

EXAMPLES

The fiber reinforced resin composition was prepared using the pellet manufacturing machine in FIG. 1.

Manufacturing Conditions

Die: It was attached at the tip of an extruder of diameter 50 mm, and four rods were arranged as a straight line in the impregnating section.

Fiber diameter: Glass roving was used which was bundled 170 glass fibers each having 16 ,,m in fiber diameter, the glass fibers being surface-treated in advance with amino silane.

Preheating temperature: 200° C.

Thermoplastic resin: block polypropylene of MFR50+carboxylic acid modified polypropylene.

Melting temperature: 290° C.

Rods: four rods, each having 6 mm (diameter)×3 mm (length).

Under the above-mentioned conditions, while amount of the fiber bundle was regulated with tension rolls, the glass roving was provided into the die in order to subject it to impregnation. Thereafter, it was pulled out from the die, cooled, and palletized in order to prepare a resin composition including 50 wt. % glass fibers.

The obtained resin composition, mica M/B (mica 40%) and the above mentioned block polypropylene were dry blended with a ratio of resin composition:mica M/B (mica 40%):block polypropylene=20:50:30. Then, the dry blended material was molded with an injection molding machine (manufactured by TOSHIBA MACHINE CO., LTD, IS80EPN) in order to obtain molded articles. The manufacturing example was compared with comparative examples.

Ingredients for the individual resin compositions of the example and the comparative examples are shown below.

Example: containing PP used as the base material, plus 10% long fiber glass fiber, and 20% mica.

Comparative example 1: containing PP used as the base material, plus 40% long fiber glass fiber.

Comparative example 2: containing PP used as the base material plus 20% long fiber glass fiber, and 30% talc.

Comparative example 3: containing PP used as the base material, plus 10% long fiber glass fiber, and 20% talc.

Comparative example 4: containing nylon (PA6/PA66) used as the base material, plus 10% long fiber glass fiber, and 10% mineral.

Comparative example 5: containing nylon (PA6/PA66) used as the base material, plus 17% long fiber glass fiber, and 21% mineral.

Comparative example 6: containing PP recycled material used as the base material, plus 40% talc.

Comparative example 7: containing PP used as the base material, plus 40% talc. Generally, the composition of this comparative example 7 was used conventionally.

Table 1 shows flexural elasticity modulus, weight of resin composition when molded as a case and a cover for an air cleaner, and inertance with respect to these example and comparative examples. The inertance is the transfer function which is acquired by adding a force (F) perpendicularly to wall of the intake system, and measuring the acceleration level (a) at when the force (F) is added, and deriving from the level (a). Consequently, if the inertance level is low, it means that the face measured is hard to vibrate.

TABLE 1

| | Contents | | | Flexural | Weight | | | |
| | Base material | Component | Specific gravity | elasticity modulus (Mpa) | CASE | Compare to comparative example 7 | COVER | Compare to comparative example 7 | Typical value of inartance (dB) |
|---|---|---|---|---|---|---|---|---|---|
| Example | PP | Long fiber GF 10%/ Mica 20% | 1.12 | 6230 | 626.9 | −11.7% | 641.0 | −9.6% | 21.5 |
| Comparative Example1 | PP | Long fiber GF 40% | 1.22 | 8750 | 642.6 | −5.2% | 682.0 | −3.8% | 22.6 |
| Comparative Example2 | PP | Long fiber GF 20%/ Talc 30% | 1.36 | 8900 | 769.8 | 8.5% | 772.0 | 8.9% | 21.1 |
| Comparative Example3 | PP | Long fiber GF 10%/ Talc 20% | 1.12 | 5670 | 630.8 | −11.1% | 650.5 | −8.3% | 23.8 |
| Comparative Example4 | PA6/PA6 (50/50) | Long fiber GF 10%/ Mineral 10% | 1.28 | 5380 | 748.3 | 5.4% | 740.5 | 4.4% | 36.1 |
| Comparative Example5 | PA6/PA6 (50/50) | Long fiber GF 17%/ Mineral 21% | 1.45 | 8570 | 844.7 | 19.0% | 838.9 | 18.3% | 32.9 |
| Comparative Example6 | PP Recycled material | Talc 40% | 1.24 | 3400 | 706.4 | −0.5% | 713.9 | 0.7% | 27.8 |
| Comparative Example7 | PP | Talc 40% | 1.23 | 4850 | 709.7 | — | 709.0 | — | 23.3 |

From Table 1, it is understood that the air cleaner of the example according to this invention can reduce the specific gravity at about 10% as compared with that of the comparative example 7 used conventionally, and the inertance of the example is also low (that is, it becomes hard to vibrate). Although the lowest inertance is obtained in the case of the comparative example 2, the weight reduction effect is not expected relatively in this case because the specific gravity of this case is amply large.

Figure 2:
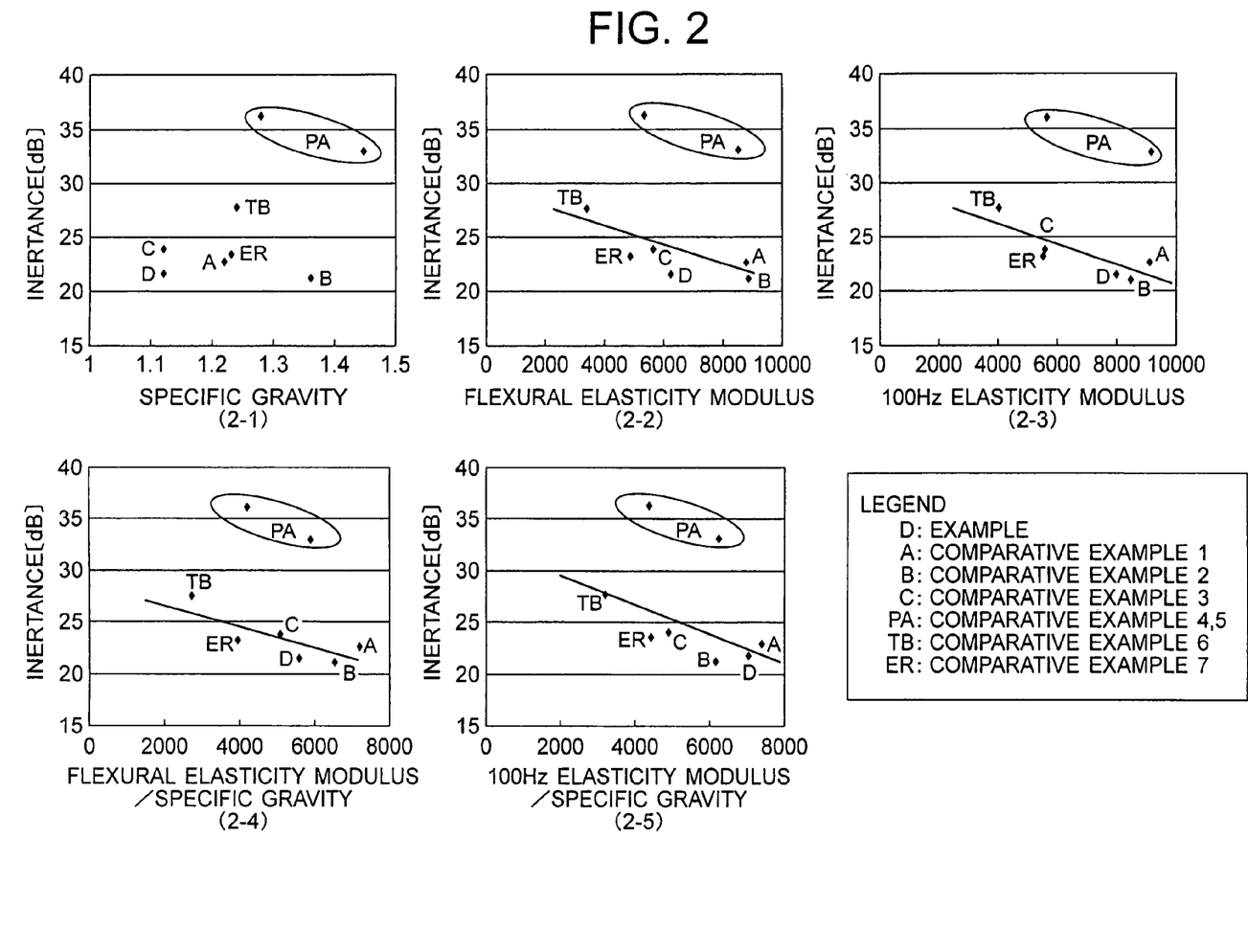
FIG. 2 are graphs showing a relation between specific gravity and inertance (FIG. 2-1), a relation between flexural elasticity modulus and inertance (FIG. 2-2), a relation between 100 Hz elasticity modulus and inertance (FIG. 2-3), a relation between flexural elasticity modulus/specific gravity and inertance (FIG. 2-4), and a relation between 100 Hz elasticity modulus/specific gravity and inertance (FIG. 2-5) respectively.

FIG. 2 show a relation between specific gravity and inertance (FIG. 2-1), a relation between flexural elasticity modulus and inertance (FIG. 2-2), a relation between 100 Hz elasticity modulus and inertance (FIG. 2-3), a relation between flexural elasticity modulus/specific gravity and inertance (FIG. 2-4), and a relation between 100 Hz elasticity modulus/specific gravity and inertance (FIG. 2-5), respectively, with respect to these example and comparative examples. Here, the flexural elasticity modulus means elasticity modulus when sample is bended slowly, and 100 Hz elasticity modulus means dynamic modulus with frequency of 100 Hz.

There is a correlation between the flexural elasticity modulus and the inertance as illustrated in the graphs of FIG. 2-2 and FIG. 2-3. Particularly, the 100 Hz dynamic modulus and the inertance show a more effective correlation.

Regarding the resin composition of the present example, since the 100 Hz dynamic modulus is high, the inertance can be reduced, and more advantageously, as shown in FIG. 2-1, the specific gravity is low. Conjointly these high flexural elasticity modulus and low specific gravity can reduce the noise for vibration that is the theme of this embodiment. Contrary, in the comparative example 4 and the comparative example 5 in which the base material is nylon, although the flexural elasticity modulus is high, there is a tendency that the inertance is also high. For these results, it is hard to reduce the noise for vibration.

Figure 3:
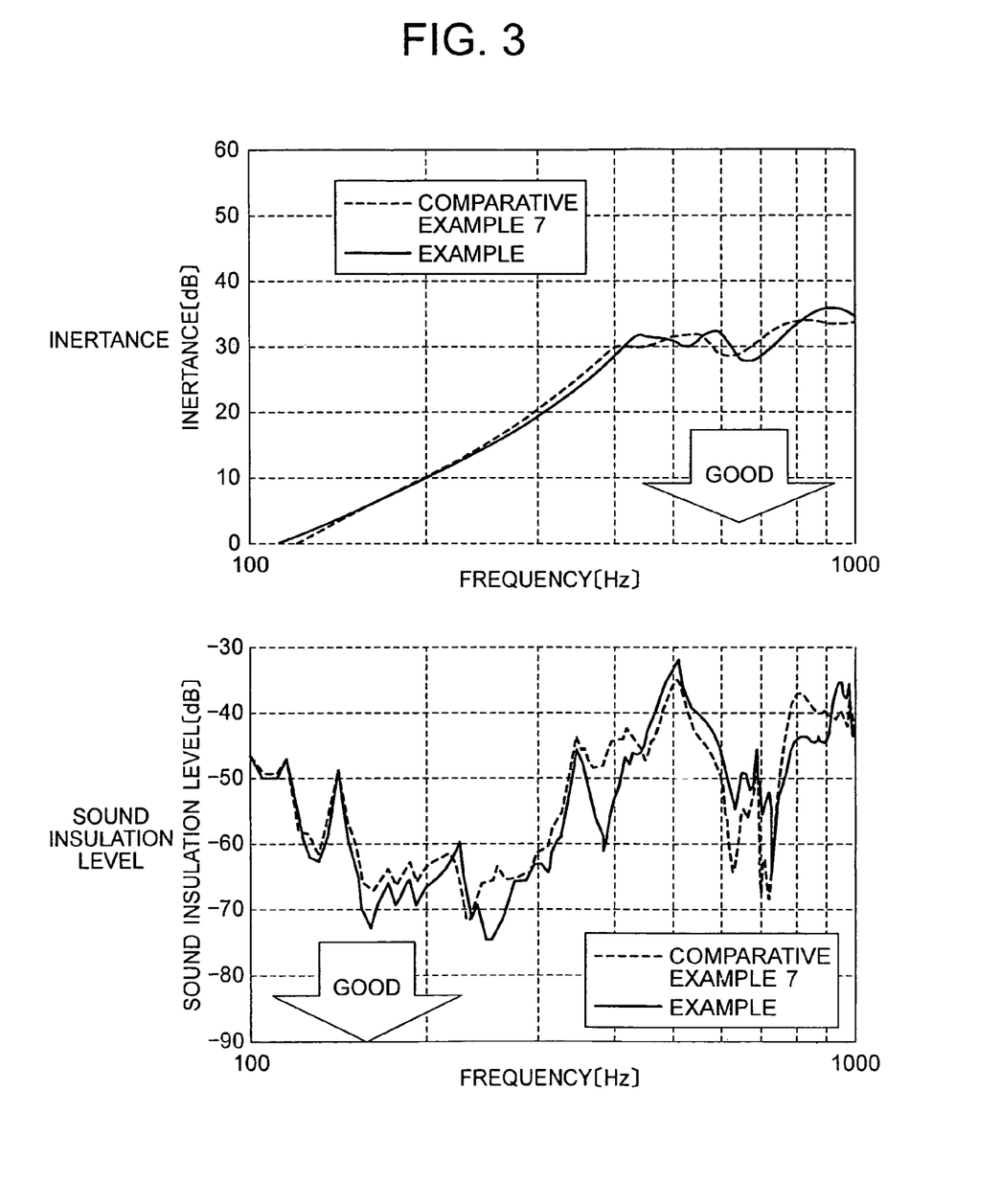
FIG. 3 are graphs showing a relation between frequency and inertance, and a relation between frequency and sound insulation level, respectively.

In FIG. 3, the present example and the comparative example 7 are compared with respect to the relation between the frequency and the inertance, and the relation between the frequency and the sound insulation level. The sound insulation level means the sound strength that how much sound comes out from an air cleaner when the sound outputs from a speaker. The lower the sound insulation level becomes, the more the sound insulation is performed. From these FIGS., it is found that the inertance and the sound insulation level in a low frequency region are low in the example. In addition, a thickness is the same between the example and the comparative example 7, and the weight in the example is low at about 10% as compared with that of the comparative example 7.

Figure 4:
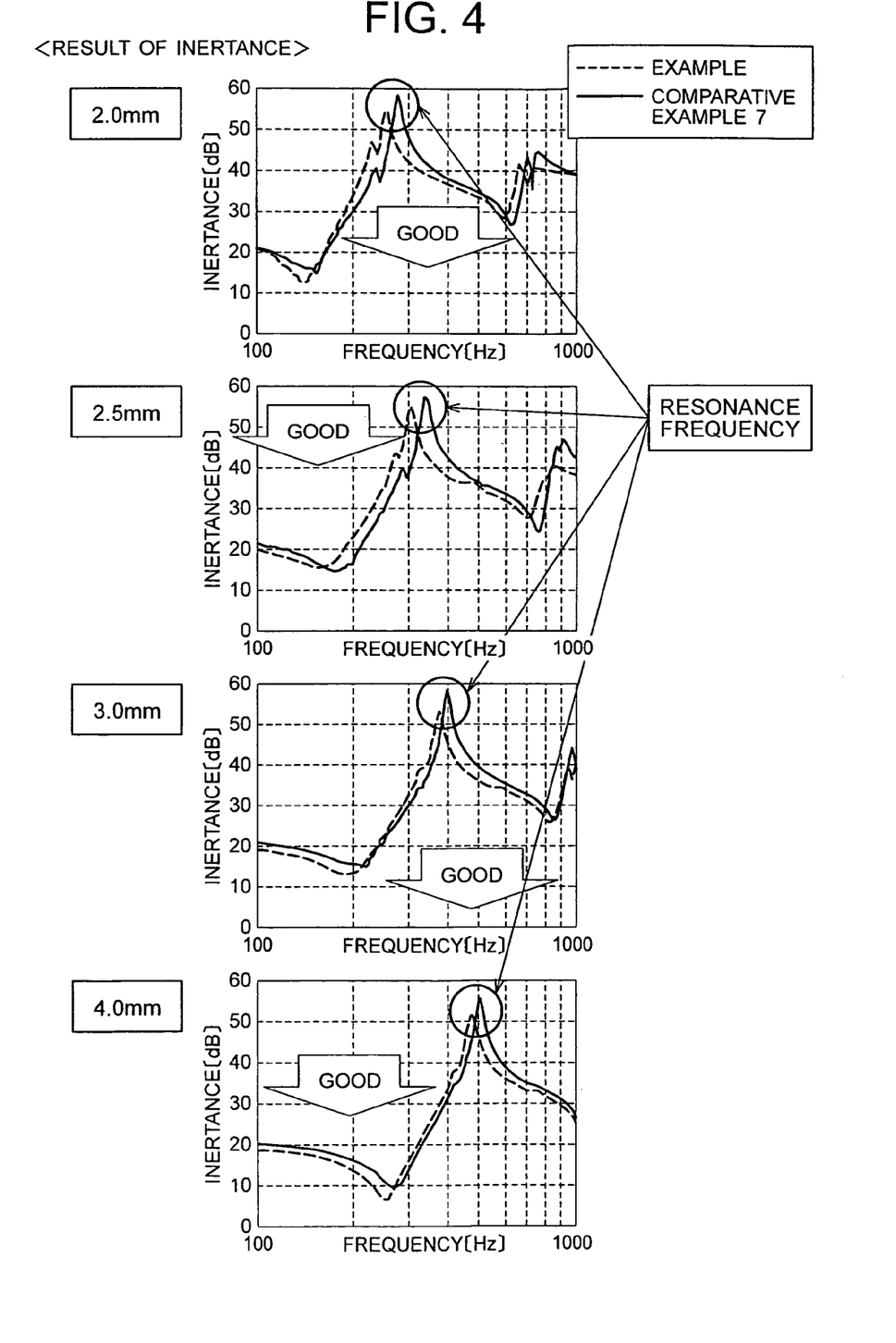
FIG. 4 are graphs showing relations between frequency and inertance, when the thickness of parts were varied as 2 mm, 2.5 mm, 3.0 mm, and 4.0 mm.

In FIG. 4, the present example and the comparative example 7 are compared with respect to the relation between the frequency and the inertance when varying the thickness as 2 mm, 2.5 mm, 3.0 mm, and 4.0 mm. From these FIGS., it is found that the resonance frequency can be heighten and the inertance in a low frequency region can be reduced in the present example under the condition of the same thickness.

Figure 5:
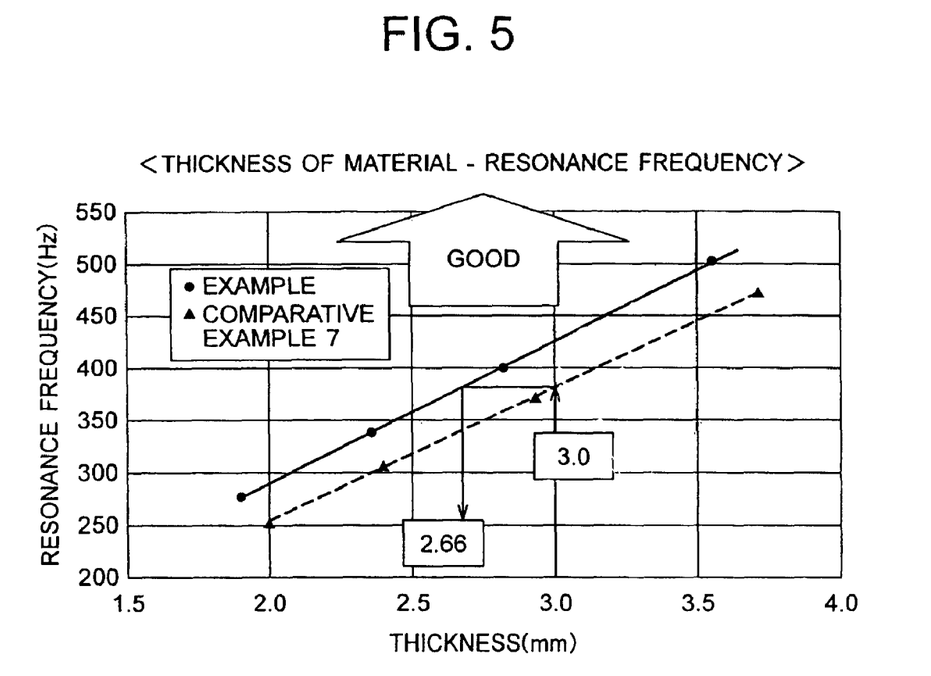
FIG. 5 is a graph plotted the relation between thickness and inertance resonance frequency.

FIG. 5 is a graph plotted the relation between the thickness and the inertance resonance frequency with respect to the present example and the comparative example 7. From FIG. 4, when the same resonance frequency is obtained, nearly equal inertance levels are performed. The example shows an excellent level of the inertance, and when the same inertance level as the comparative examples is intended by the present invention, the board thickness can be reduced from 3 mm to 2.66 mm.

In table 2, the values of the specific gravity x the thickness is compared between the present example of which thickness is 2.66 mm and the comparative example 7 of which thickness is 3 mm. When the same inertance level as the comparative examples is intended by the present invention, it is possible to obtain the weight loss of at 19.2% in the present invention because of the reduced specific gravity and thin thickness which are functioned conjointly.

TABLE 2

| Material Component | Specific gravity | Thickness, inartance is similar to comparative example 7 in 3 mm thickness (mm) | Specific gravity × Thickness | Merit for weight reduction (%) |
|---|---|---|---|---|
| Comparative Example 7: Talc 40% | 1.23 | 3.00 | 3.69 | — |
| Example: Long fiber GF 10% + Mica 20% | 1.12 | 2.66 | 2.98 | 19.2 |

What is claimed is:

1. A fiber reinforced resin composition for parts of an intake system on an internal combustion engine, the resin composition comprising:
    a block polypropylene resin which has a melt flow rate in a range of 40-70 g/10 minutes at 230° C., under a load of 2.16 kg, and which is in a range of 60-80% by weight of the composition;
    glass fibers in a range of 5-15% by weight of the composition; and
    mica in a range of 15-25% by weight of the composition, wherein the parts of the intake system is any one of:
    an air duct constituting an intake channel of internal combustion engine;
    a resonator or a side branch which is provided in the intake channel of the internal combustion engine and functions for reducing intake noise; and an air cleaner which collects dusts in the intake channel of the internal combustion engine.

2. A fiber reinforced resin composition for parts of an intake system on an internal combustion engine, the resin composition comprising:
    a block polypropylene resin which has a melt flow rate in a range of 40-70 g/10 minutes at 230° C., under a load of 2.16 kg, and which is in a range of 58-78% by weight of the compositions;
    an acid modified polypropylene resin which is in a range of 1-2% by weight of the composition;
    glass fibers in a range of 5-15% by weight of the composition; and
    mica in a range of 15-25% by weight of the composition, wherein the parts of the intake system is any one of:
    an air duct constituting an intake channel of internal combustion engine;
    a resonator or a side branch which is provided in the intake channel of the internal combustion engine and functions for reducing intake noise; and
    an air cleaner which collects dusts in the intake channel of the internal combustion engine.

3. The fiber reinforced resin composition for parts of the intake system on the internal combustion engine according to claim 1, wherein the glass fibers have a diameter of 3-30 mm.

4. The fiber reinforced resin composition for parts of the intake system on the internal combustion engine according to claim 1, wherein the glass fibers have a length of 1.5-60 mm.

5. The fiber reinforced resin composition for parts of the intake system on the internal combustion engine according to claim 1, wherein the glass fibers are bundled in a range of 400-10,000.

6. The fiber reinforced resin composition for parts of the intake system on the internal combustion engine according to claim 1, wherein the glass fibers are surface treated with a compound selected from the group consisting of γ-aminopropyl trimethoxysilane, N-β-(aminoethyl)-γ-aminopropyl trimethoxysilane, γ-glycidoxypropyl trimetoxysilane, β-(3,4-epoxycyclohexyl)ethyl trimethoxysilane vinyl triethoxysilane, vinyl-tris(beta-methoxyethoxy)silane, γ-methacryloxypropyl trimethoxysilane, β-(2,4-epoxycyclohexyl) ethoxymethoxysilane, γ-(2-aminoethyl) aminopropyl trimethoxysilane and N-β-(aminoethyl)-γ-aminopropyl trimethoxysilane.

7. The fiber reinforced resin composition for parts of the intake system on the internal combustion engine according to claim 1, wherein the composition shifts the intakes system's resonance frequency to greater than 400 Hz, thereby reducing intake noise at a range of 100-400 Hz.

8. The fiber reinforced resin composition for parts of the intake system on the internal combustion engine according to claim 2, wherein the glass fibers have a diameter of 3-30 mm.

9. The fiber reinforced resin composition for parts of the intake system on the internal combustion engine according to claim 2, wherein the glass fibers have a length of 1.5-60 mm.

10. The fiber reinforced resin composition for parts of the intake system on the internal combustion engine according to claim 2, wherein the glass fibers are bundled in a range of 400-10,000.

11. The fiber reinforced resin composition for parts of the intake system on the internal combustion engine according to claim 2, wherein the glass fibers are surface treated with a compound selected from the group consisting of γ-aminopropyl trimethoxysilane, N-β-(aminoethyl)-γ-aminopropyl trimethoxysilane, γ-glycidoxypropyl trimetoxysilane, β-(3,4-epoxycyclohexyl)ethyl trimethoxysilane vinyl triethoxysilane, vinyl-tris(beta-methoxyethoxy)silane, γ-methacryloxypropyl trimethoxysilane, β-(2,4-epoxycyclohexyl) ethoxymethoxysilane, γ-(2-aminoethyl) aminopropyl trimethoxysilane and N-β-(aminoethyl)-γ-aminopropyl trimethoxysilane.

12. The fiber reinforced resin composition for parts of the intake system on the internal combustion engine according to claim 2, wherein the composition shifts the intakes system's resonance frequency to greater than 400 Hz, thereby reducing intake noise at a range of 100-400 Hz.

13. An intake system for an internal combustion engine comprising the fiber reinforced resin composition according to claim 1.

14. An intake system for an internal combustion engine comprising the fiber reinforced resin composition according to claim 2.

* * * * *